BEST AVAILABLE COPY

T857,023

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED DECEMBER 10, 1968

857 O.G. 368

708,476

METHOD FOR MAKING THERMOGRAPHIC COPIES FROM NON-INFRARED ABSORBING ORIGINALS

Frank D. Allen, deceased, late of Rochester, N.Y., by Mona Armstrong Allen, executrix, 455 Thomar Drive, Rochester, N.Y.

Filed Feb. 21, 1968. Published Dec. 10, 1968

Class 96—27

No Drawing. 20 Pages Specification

A process is described for preparing thermographic copies from substantially non-infrared-absorptive original images. The process comprises exposing a photosensitive element to actinic radiation through the original, forming with the element an infra-red absorptive image and then employing this infrared absorptive image as a second generation original in a thermographic copying process. In one embodiment an infrared absorptive image is prepared by employing as the photosensitive element a photothermographic element which undergoes a change in tackifying point upon photoexposure. After heating, composition from areas having a lower tackifying point is transferred to a receiving sheet, if an infrared absorptive colorant is incorporated in the composition, or is toned with an infrared absorptive material. An example of a suitable photothermographic element is one containing a layer of a photosensitive copolyester composition containing as an integral portion the light-sensitive grouping $$-CH{=}CH-\overset{\overset{\displaystyle O}{\|}}{C}-$$

In a second embodiment an infrared absorptive image is prepared by the image-wise photodestruction of a photobleachable dye, such as a polymethine pyrylium dye or a polymethine cyanine dye, contained in the photosensitive element.